Patented Jan. 3, 1933

1,892,902

UNITED STATES PATENT OFFICE

DAVID RASKY, OF DULUTH, MINNESOTA, ASSIGNOR, BY MESNE ASSIGNMENTS, TO THE INTERNATIONAL HONEY-BUTTER CORPORATION, OF CLEVELAND, OHIO, A CORPORATION OF OHIO

FOOD PRODUCT AND PROCESS OF PRODUCING THE SAME

No Drawing. Application filed January 29, 1930. Serial No. 424,451.

This invention relates to a novel food product and process of producing the same, and comprises an admixture of honey and butter.

It is well known that honey and butter have heretofore been mixed to form a new food product, but in each instance where this has been done desirable characteristics of the butter have been lost during the mixing process, and it is the principal object of my present invention to provide a product containing butter and a substantial quantity of honey united into a homogeneous mass which resembles commercial butter and has the same relative density thereof so that my honey and butter product may be cut, wrapped, and packed in the standard machines available for that purpose.

Another object of my present invention is to provide a process for the admixing of honey and butter in the least time possible, and with the standard machines available to the creamery trade.

Further objects and advantages of the invention will become apparent in the following description thereof.

My product consists only of honey and butter, and the term honey is used to include natural bees' honey, or a product artificially prepared as a substitute therefor; and similarly the term butter is used to include butter and butter substitutes such as are common on the market.

The proportions of the materials employed are not material, but I have found that an excellent product may be produced from 50% honey and 50% butter.

In the manufacture of the product the honey, preferably in liquid form, is placed in a hot well and heated to a temperature of 120° to 130° F., and is then placed in a vacuum pan or condenser for removing moisture and air, and wherein the honey will boil at a lower temperature ranging from 90° to 127° F. under vacuum, but the temperature in the vacuum pan is held not higher than 127° F., as at higher temperatures the honey would lose its flavor or become burned. While in the vacuum pan some of the air and a small percentage of moisture will be evaporated, approximately 7%, which is found to result when ultimately mixed with the butter in a better commercial and a more palatable product. The honey is then removed from the pan and allowed to cool to preferably 80° to 90° F.

This vacuum treatment is necessary in order to obtain a better commercial product, since by such treatment, the viscosity of the honey is increased because of the removal of water and air therefrom as pointed out hereinbefore; also its granulating temperature is reduced in proportion to the amount of water removed, whereby, when mixed with the butter, the product may be kept at a low temperature without granulation occurring; such as when in cold storage or in refrigerated cars during shipment.

It has been found that for best results in the preliminary preparation of the butter great care must be taken to maintain same in a cool state, and which is preferably continued throughout the mixing process. Therefore the butter is kept preferably at a temperature of approximately 40° to 50° F. and is first mixed slowly in any suitable appliance such as a rotary mixing machine, when, due to the said temperature of the butter while being mixed, a part of the contained moisture is separated from the butter. The speed of the machine is then increased, when the butter in its changed condition will again take up the water, putting it in condition to receive the honey; this whole operation of preparing the butter consuming about one to three minutes.

The honey is then added to the cool butter, preferably in equal amounts, and mixed slowly until the product takes on a kernelly form, when, upon continued mixing, it will coagulate to a semblance of commercial butter. This mixing operation will consume about one or two minutes. The speed of the mixer is then approximately doubled and the mixing continued, when the outside of the bowl is then quickly tempered as with a hose or spray of warm water, or if mixed in a jacketed bowl flushing same quickly, or otherwise suddenly warming if preferred, which will release any material adhering to the bowl, and insure a wholly uniform admixture, and also prevent too great an amount of air being incorporated therein. After mixing a few minutes longer the honey and butter become thoroughly comingled whereby the particle of honey is surrounded by the particles of butter, and the product is taken out at a temperature of about 60° to 70° F. preferably, when it may be placed in boxes in refrigerating rooms, and subsequently cut and wrapped in a manner similar to that of commercial butter.

During the entire process the butterfat is not melted which is a very essential feature in the novel method, as well as the fact that the finished product has the same relative density as butter, whereby a pound of the product displaces the same space as a pound of butter and consequently the same machines may be used for wrapping and packing the product.

From the foregoing it appears that there has been produced a product consisting of an emulsion of liquid honey and butter in which the butter is the dispersing or continuous phase and the honey is the dispersed or discontinuous phase. In other words, it is an emulsion of honey in butter, or one in which the honey particles are surrounded by butter.

Having thus described my invention, what I claim and desire to secure by Letters Patent, is:

1. The herein described method of mixing extracted honey and butter comprising first preparing the honey by heating same in partial vacuum to avoid over-heating, then partially cooling and uniting with butter which had been separately slowly mixed until it lost a portion of its contained moisture and then rapidly mixed until it again absorbed said moisture, then mixing the honey and butter until it assumes a fluffy consistency, when the conclusion of the working operation is governed by the desired relative density.

2. The herein described method of preparing a mixture of extracted honey with butter comprising; first, heating the honey in partial vacuum to increase its viscosity and reduce the air and moisture content without detriment thereto; separately slowly stirring the butter until it has lost a portion of its contained moisture and then rapidly stirring same until it again absorbs said moisture; and then mixing the honey thus prepared and the butter thus prepared at a temperature below the melting point of butter fat.

3. An edible emulsion consisting of butter and liquid honey wherein the honey constitutes the discontinuous phase and the butter the continuous phase.

4. An edible emulsion consisting of butter and liquid honey wherein the honey constitutes the discontinuous phase and the butter the continuous phase, said product having substantially less moisture than the combined moisture content of the original ingredients.

In testimony whereof I affix my signature.

DAVID RASKY.